(12) United States Patent
Miyoshi et al.

(10) Patent No.: US 7,740,433 B2
(45) Date of Patent: Jun. 22, 2010

(54) WATERPROOF STRUCTURE FOR PORTION WHERE MEMBERS ARE TIGHTENED WITH SCREW

(75) Inventors: Sachiyo Miyoshi, Yokohama (JP); Kiyoshi Naito, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 157 days.

(21) Appl. No.: 11/920,502

(22) PCT Filed: May 16, 2006

(86) PCT No.: PCT/JP2006/310092

§ 371 (c)(1),
(2), (4) Date: Nov. 16, 2007

(87) PCT Pub. No.: WO2006/123809

PCT Pub. Date: Nov. 23, 2006

(65) Prior Publication Data

US 2009/0104000 A1     Apr. 23, 2009

(30) Foreign Application Priority Data

May 17, 2005   (JP)   ............................. 2005-143507

(51) Int. Cl.
*F16B 43/00*     (2006.01)
(52) U.S. Cl. ...................... 411/371.1; 411/542; 411/915
(58) Field of Classification Search .............. 411/371.1, 411/371.2, 915, 542, 369, 538; 277/642
See application file for complete search history.

(56) References Cited

U.S. PATENT DOCUMENTS 2,735,572 A * 2/1956 Getz ........................... 220/246

(Continued)

FOREIGN PATENT DOCUMENTS

JP    58-191414    12/1983

(Continued)

OTHER PUBLICATIONS

International Preliminary Examination Report (Application No. PCT/JP2006/310092) dated Mar. 27, 2008.

(Continued)

*Primary Examiner*—Gary Estremsky
(74) *Attorney, Agent, or Firm*—Eric J. Robinson; Robinson Intellectual Property Law Office, P.C.

(57) ABSTRACT

A waterproof structure for a tightening section where a first member (1) having a screw hole (1a) with a bottom and a second member (2) having a screw insertion hole (2a) are fastened with a screw (4) that is inserted into the screw insertion hole (2a) and screwed to the screw hole (1a). The screw (4) is a flat head screw, and an annular groove (3b) is formed in the outer surface of a spacer (3) having an insertion hole where recessed circular conical surface (3a) is formed. The spacer (3) is fitted in the screw insertion hole (2a) to be in surface contact with a circular conical surface of a head of the flat head screw. The annular groove (3b) is coaxial with the recessed circular conical surface (3a). An O-ring (5) is installed in the annular groove (3b), and the flat head screw (4) is tightened with the spacer (3) placed between first member and the second member, causing the O-ring (5) to be pressed between an inner surface of the annular groove (3b) and a surface of the screw insertion hole of the second member (2). The waterproof structure can be repeatedly used without damaging the members and does not enlarge a necessary space.

2 Claims, 4 Drawing Sheets

U.S. PATENT DOCUMENTS

| | | | | | |
|---|---|---|---|---|---|
| 2,884,099 | A | * | 4/1959 | Nenzell | 411/548 |
| 3,884,006 | A | * | 5/1975 | Dietlein | 52/787.12 |
| 5,320,460 | A | * | 6/1994 | Murakami et al. | 411/55 |
| 5,340,255 | A | * | 8/1994 | Duran | 411/373 |
| 5,988,965 | A | * | 11/1999 | Fiorell et al. | 411/303 |
| 6,149,364 | A | * | 11/2000 | Maeda | 411/432 |

FOREIGN PATENT DOCUMENTS

| | | |
|---|---|---|
| JP | 61-084796 | 6/1986 |
| JP | 02-101120 | 8/1990 |
| JP | 03-204407 | 9/1991 |
| JP | 11-037132 | 2/1999 |
| JP | 11-037133 | 2/1999 |
| JP | 11-229790 | 8/1999 |
| JP | 2005-036962 | 2/2005 |
| JP | 2005-048836 | 2/2005 |

OTHER PUBLICATIONS

International Search Report (Application No. PCT/JP2006/310092).

* cited by examiner

WATERPROOF STRUCTURE FOR PORTION WHERE MEMBERS ARE TIGHTENED WITH SCREW

TECHNICAL FIELD

The present invention relates to a waterproof structure for a portion where members are tightened with a screw.

BACKGROUND ART

FIG. 4 shows an example of a conventional waterproof structure for a portion where members are tightened with a screw. FIG. 4 shows a state of a tightening section where a first member 10 and a second member 11 are fastened with a bolt 12, the tightening section being cut out by a plane passing through a central axis of the bolt 12.

In the first member 10, a screw hole 10a with a bottom is provided, and in the second member 11, a screw insertion hole 11a is provided. The second member 11 is fastened to the first member 10 by screwing the bolt 12 which passes through the screw insertion hole 11a into the screw hole 10a with a bottom.

Then, to form a waterproof structure, a spacer 13 and a packing 14 are placed between the bolt 12 and the second member 11. In addition, FIG. 4 exaggeratedly shows a state in a larger scale before the packing 14 is deformed. A ring-like packing 14 having a rectangular cross-section made of rubber is fitted in a dent of the spacer 13 made of metal and placed on the screw insertion hole 11a of the second member 11 mounted on the first member 10, and the bolt 12 is inserted into the packing 14 to be tightly screwed into the screw hole 10a with a bottom.

A lower surface of the spacer 13 is pressed against an upper surface of the second member 11 by tightening up the bolt 12, and further the packing 14 is compressed and pressed against an inner surface of the spacer 13, an outer surface of the bolt 12 and the upper surface of the second member 11, providing a waterproof property.

In the conventional waterproof structure for a portion where members are tightened with a screw described above shown in FIG. 4, a bottom surface of the spacer 13 is arranged to abut on the upper surface of the second member 11 for positioning in the vertical direction, which has presented a problem that the surface of the second member 11 was scraped away, when it was made of resin. Also, the packing 14 gets entangled with a screw portion of the bolt 12, which leads to a problem that the packing 14 becomes unusable, when the bolt 12 is repeatedly tightened.

Further, because the packing 14 gets entangled with the screw portion of the bolt 12 in a process of tightening the bolt 12, the spacer 13 and the packing 14 are rotated together with the bolt 12, so that there arises a problem that the packing 14 is likely to be deformed.

Also, because lower surfaces of the spacer 13 and the packing 14 are arranged to abut on the upper surface of the second member 11, the upper surface of the second member 11 has to be a horizontal surface. Then, because a head of the bolt 12 is mounted on the upper surface of the second member 11, the spacer 13 and the head of the bolt are protruded from the upper surface of the second member 11, presenting a problem of requiring a larger, necessary space.

In a waterproof structure for apparatuses proposed in Japanese Patent Application Laid-Open No. 2000-277934, a first boss 33 is provided in a front case 31 in a protruding manner toward a rear case 41, and a second boss 43 is provided in a protruding manner in the rear case 41 to be opposite to the first boss 33.

Then, a through hole 44 is made into the second boss 43 to insert a fixing screw 55 thereinto, and a hole 34 with a bottom is made into the first boss 33 to screw the fixing screw 55 thereto. Also, an annular groove 45 coaxial with the through hole 44 is formed in a surface of the second boss 43 opposite to the first boss 33, and an O-ring 46 is positioned in this annular groove 45.

On the one hand, in a surface of the first boss 33 opposite to the second boss 43, an annular projection 35 is formed to be opposite to the annular groove 45. Then, when the front case 31 and the rear case 41 are fitted in each other, the annular projection 35 is arranged to press the O-ring 46.

In the waterproof structure for apparatuses proposed in Japanese Patent Application Laid-Open No. 2000-277934 described above, because the O-ring 46 is pressed by the annular projection 35, too strong fastening force on the fixing screw 55 may damage the O-ring 46, causing a problem that the O-ring cannot be repeatedly used.

DISCLOSURE OF THE INVENTION

Problems to be Solved by the Invention

The present invention was made in view of the points described above, and an object thereof is to provide a waterproof structure for a portion where members are tightened with a screw, not damaging the members and allowing for repeated use, with a necessary space not being enlarged.

Means for Solving the Problems

A waterproof structure for a portion where members are tightened with a screw according to the present invention is a waterproof structure for a tightening section where a first member having a screw hole with a bottom and a second member having a screw insertion hole with a screw that is inserted into the screw insertion hole and screwed to the screw hole, the waterproof structure being configured in such a way that the screw is a flat head screw, an annular groove coaxial with a recessed circular conical surface is provided in an outer surface of a spacer fitted in the screw insertion hole, having an insertion hole, in which the recessed circular conical surface is formed to be in surface contact with a circular conical surface of a head of the flat head screw, an O-ring is fitted in the annular groove, the spacer is placed between the first member and the second member, and the O-ring is pressed against an inner surface of the annular groove and a surface of the screw insertion hole of the second member by tightening up the flat head screw.

Also, in the waterproof structure for a portion where members are tightened with a screw described above, the surface of the second member against which the O-ring is pressed is a circular conical surface coaxial with the flat head screw.

Further, in the waterproof structure for a portion where members are tightened with a screw described above, the surface of the second member against which the O-ring is pressed is a plane surface orthogonal to a central axis of the flat head screw.

Moreover, in the waterproof structure for a portion where members are tightened with a screw described above, the surface of the second member against which the O-ring is pressed is a cylindrical surface coaxial with the flat head screw.

ADVANTAGES OF THE INVENTION

Owing to the waterproof structures for a portion where members are tightened with a screw according to the present invention, the O-ring is pressed by the surface not to be damaged, enabling repeated use. Further, the head of the flat head screw is put in the screw insertion hole of the second member, therefore the head of the screw is not protruded above the second member, eliminating enlargement of a necessary space.

BEST MODES FOR CARRYING OUT THE INVENTION

Now, a best mode for carrying out the present invention will be hereinafter described with reference to embodiments.

Embodiment 1

Figure 1:
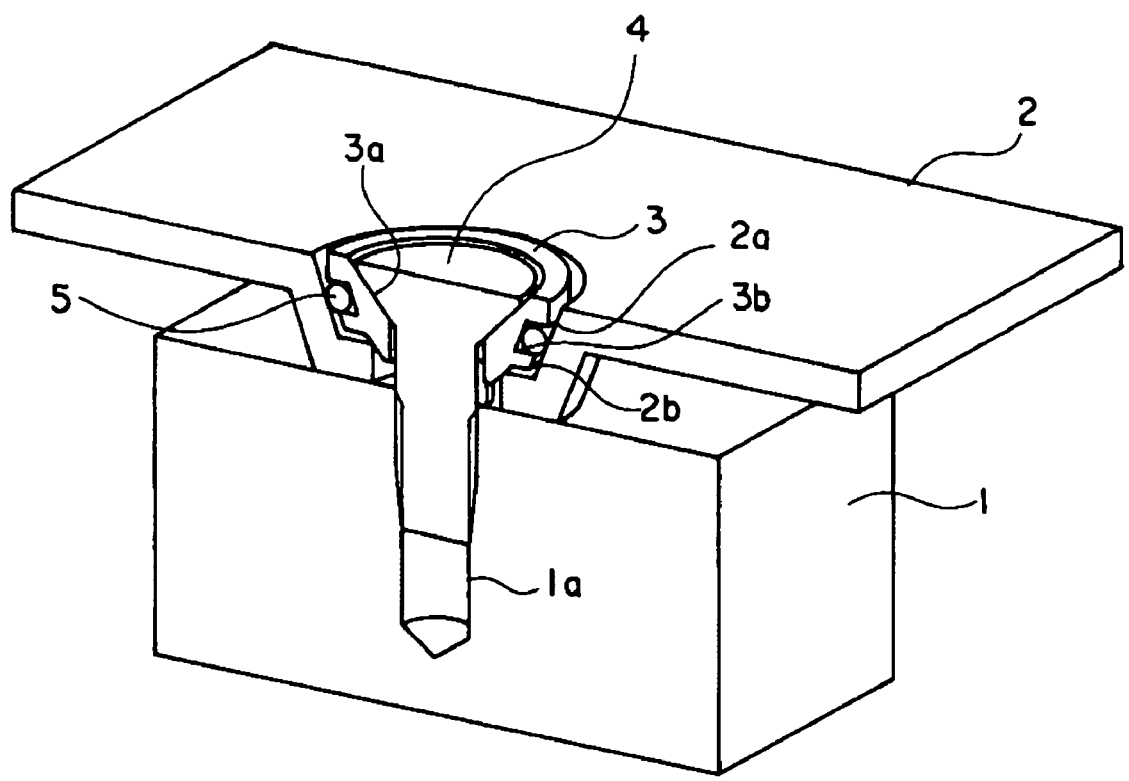
FIG. 1 is a partially cut away, perspective view illustrating a waterproof structure for a portion where members are tightened, of a first embodiment according to the present invention.

FIG. 1 is a partially cut away, perspective view illustrating a waterproof structure for a portion where members are tightened, of a first embodiment according to the present invention, illustrating a tightening section where a first member 1 and a second member 2 are fastened with a flat head screw 4, the tightening section being cut out with a plane passing through a central axis of the flat head screw 4.

In the first member 1 shown in FIG. 1, a screw hole 1a with a bottom is provided, and in the second member 2, a screw insertion hole 2a is provided. The second member 2 is fastened to the first member 1 by screwing the flat head screw 4 which passes through the screw insertion hole 2a into the screw hole 1a with a bottom.

Then, to form a waterproof structure, a spacer 3 and an O-ring 5 are placed between the flat head screw 4 and the second member 2. In the inside of the spacer 3, a recessed circular conical surface 3a is formed to be in surface contact with a circular conical surface of a head of the flat head screw 4, and in the outside of the spacer 3, an annular groove 3b is formed.

The spacer 3 having the O-ring 5 fitted in the annular groove 3b is fitted in a circular conical surface 2b of the second member 2. Then, the flat head screw 4 is inserted into the recessed circular conical surface 3a of the spacer 3 and an insertion hole communicating with it, and screwed into the screw hole 1a with a bottom of the first member 1.

In such a manner, the second member 2 is fastened to the first member 1, and at this time, a waterproof property between the spacer 3 and the second member 2 is accomplished by the O-ring 5 pressed against these members. Also, because the circular conical surface of the head of the flat head screw 4 and the recessed circular conical surface 3a are aligned to be completely coaxial with each other when the O-ring 5 is elastically deformed, a waterproof property is accomplished by ensuring a tight surface contact.

The O-ring 5 is not damaged due to being pressed by the surface, allowing for repeated use. Further, because the head of the flat head screw 4 is put in the screw insertion hole 2a of the second member 2, the head of the flat head screw 4 is not protruded above the second member 2 and a necessary space is not enlarged.

Embodiment 2

Figure 2:
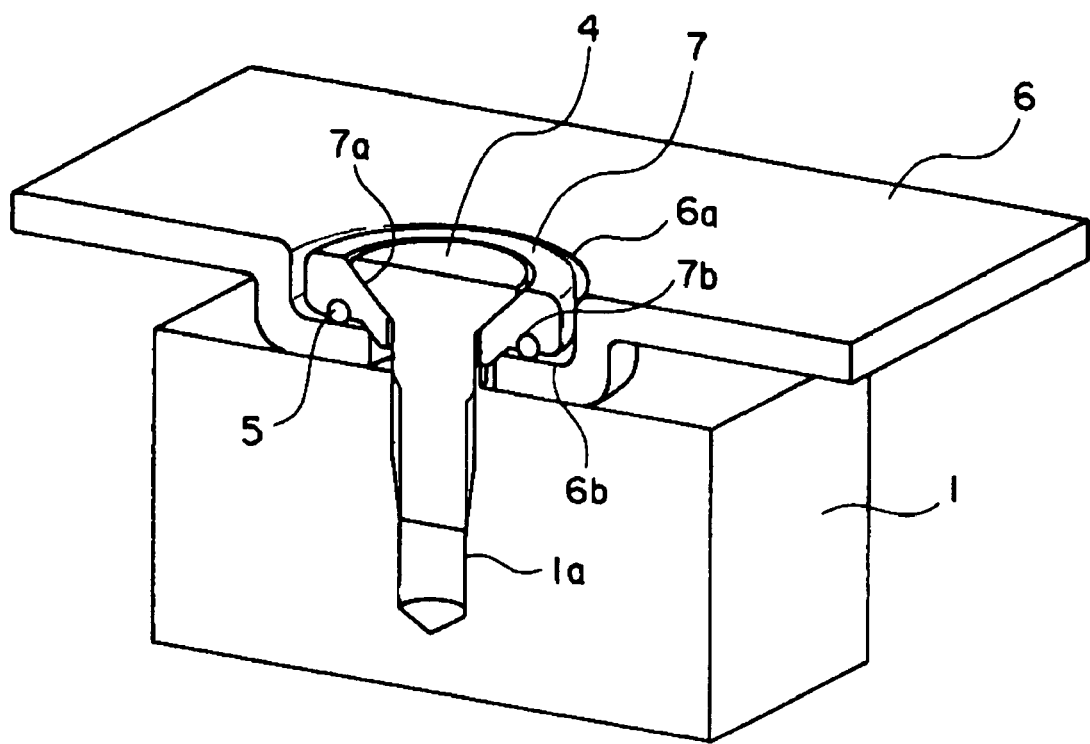
FIG. 2 is a partially cut away, perspective view illustrating a waterproof structure for a portion where members are tightened, of a second embodiment according to the present invention.

FIG. 2 is a partially cut away, perspective view illustrating a waterproof structure for a portion where members are tightened, of a second embodiment according to the present invention, illustrating a tightening section where a first member 1 and a second member 6 are fastened with a flat head screw 4, the tightening section being cut out with a plane passing through a central axis of the flat head screw 4.

In the first member 1 shown in FIG. 2, a screw hole 1a with a bottom is provided, and in the second member 6, a screw insertion hole 6a is provided. The second member 6 is fastened to the first member 1 by screwing the flat head screw 4 which passes through the screw insertion hole 6a into the screw hole 1a with a bottom.

Then, to form a waterproof structure, a spacer 7 and an O-ring 5 are placed between the flat head screw 4 and the second member 6. In the inside of the spacer 7, a recessed circular conical surface 7a is formed to be in surface contact with a circular conical surface of a head of the flat head screw 4, and the outside of the spacer 7 is formed to be an approximately cylindrical surface, and in a lower surface thereof, an annular groove 7b is formed.

The spacer 7 having the O-ring 5 fitted in the annular groove 7b is fitted in a cylindrically shaped dent of the second member 6. Then, the flat head screw 4 is inserted into the recessed circular conical surface 7a of the spacer 7 and an insertion hole communicating with it, and screwed into the screw hole 1a with a bottom of the first member 1.

In such a manner, the second member 6 is fastened to the first member 1, and at this time, a waterproof property between the spacer 7 and a plane surface 6b of the second member 6 is accomplished by the O-ring 5 pressed against these members. Also, because the circular conical surface of the head of the flat head screw 4 and the recessed circular conical surface 7a are aligned to be completely coaxial with each other when the O-ring 5 is elastically deformed, a waterproof property is accomplished by ensuring a tight surface contact.

The O-ring 5 is not damaged due to being pressed by the surface, allowing for repeated use. Further, because the head of the flat head screw 4 is put in the screw insertion hole 6a of the second member 6, the head of the flat head screw 4 is not protruded above the second member 6 and a necessary space is not enlarged.

Embodiment 3

Figure 3:
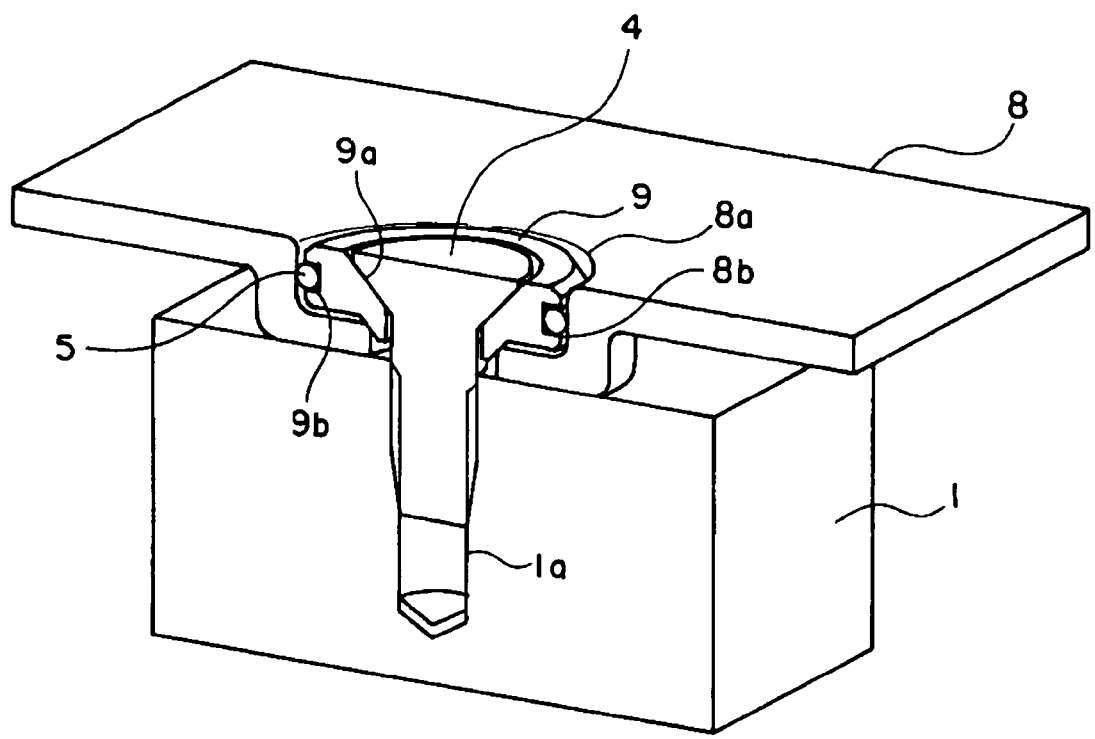
FIG. 3 is a partially cut away, perspective view illustrating a waterproof structure for a portion where members are tightened, of a third embodiment according to the present invention.
Figure 4:
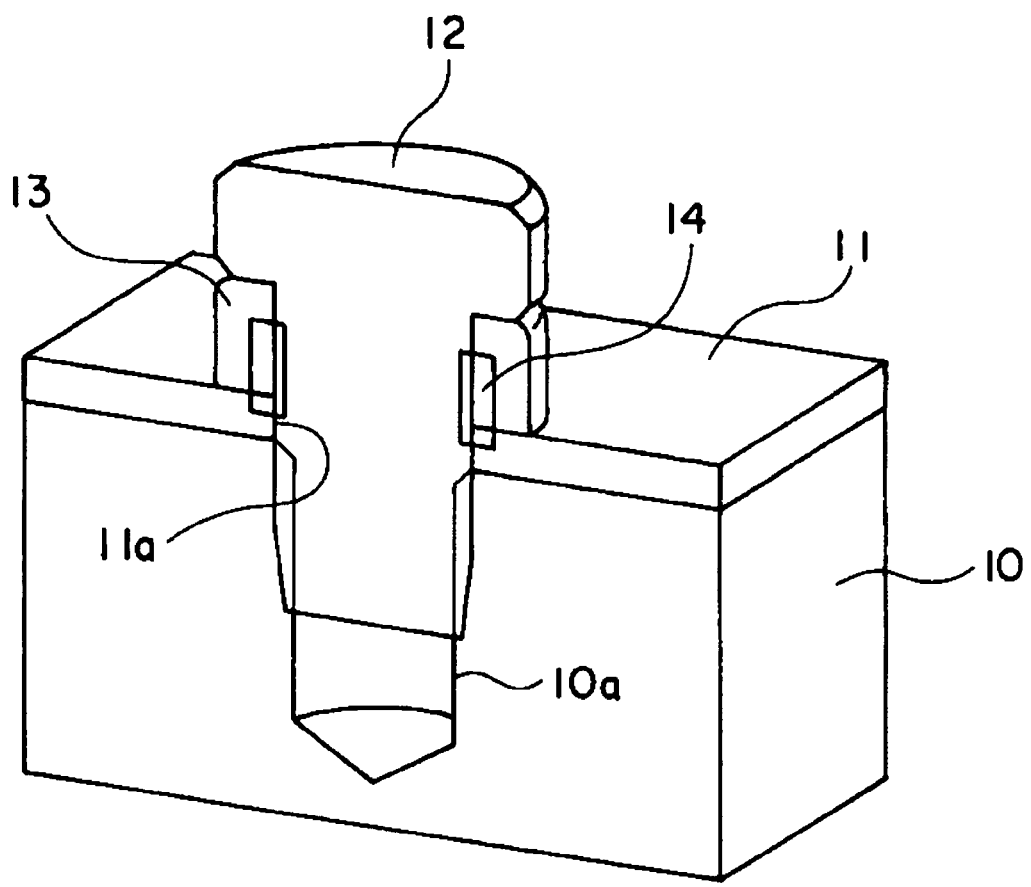
FIG. 4 is a partially cut away, perspective view illustrating a waterproof structure for a portion where members are tightened, of a conventional technique.

FIG. 3 is a partially cut away, perspective view illustrating a waterproof structure for a portion where members are tightened, which is a third embodiment according to the present invention, illustrating a tightening section where a first member 1 and a second member 8 are fastened with a flat head screw 4, the tightening section being cut out with a plane passing through a central axis of the flat head screw 4.

In the first member 1 shown in FIG. 3, a screw hole 1a with a bottom is provided, and in the second member 8, a screw insertion hole 8a is provided. The second member 8 is fastened to the first member 1 by screwing the flat head screw 4 which passes through the screw insertion hole 8a into the screw hole 1a with a bottom.

Then, to form a waterproof structure, a spacer 9 and an O-ring 5 are placed between the flat head screw 4 and the second member 8. In the inside of the spacer 9, a recessed circular conical surface 9a is formed to be in surface contact with a circular conical surface of a head of the flat head screw 4, and the outside of the spacer 9 is formed to be an approximately cylindrical surface, and in the cylindrical surface on the side surface, an annular groove 9b is formed.

The spacer 9 having the O-ring 5 fitted in the annular groove 9b is fitted in a cylindrically shaped dent of the second member 8. Then, the flat head screw 4 is inserted into the recessed circular conical surface 9a of the spacer 9 and an insertion hole communicating with it, and screwed into the screw hole 1a with a bottom of the first member 1.

In such a manner, the second member 8 is fastened to the first member 1, and at this time, a waterproof property between the spacer 9 and the cylindrical surface 8b of the second member 8 is accomplished by the O-ring 5 pressed against these members. Also, because the circular conical surface of the head of the flat head screw 4 and the recessed circular conical surface 9a are aligned to be completely coaxial with each other when the O-ring 5 is elastically deformed, a waterproof property is accomplished by ensuring a tight surface contact.

Also, the O-ring 5 is not damaged due to being pressed by the surface, allowing for repeated use. Further, because the head of the flat head screw 4 is put in the screw insertion hole 8a of the second member 8, the head of the flat head screw 4 is not protruded above the second member 8 and a necessary space is not enlarged.

The embodiments are configured as described above, but the present invention is not limited to these, for example, in the recessed circular conical surfaces 3a, 7a, 9a of the spacers 3, 7, 9, an annular groove may be provided to fit an O-ring therein, and this O-ring may be pressed by the circular conical surface of the flat head screw. In such a manner, a complete waterproof property between the flat head screw and the spacer can be accomplished.

INDUSTRIAL APPLICABILITY

In a portion where members are tightened with a screw, there can be provided a very effective waterproof structure both technically and for use.

The invention claimed is:

1. A waterproof structure for a tightening section where a first member (1) having a screw hole (1a) with a bottom and a second member (2) having a screw insertion hole (2a) are fastened with a screw that is inserted into the screw insertion hole (2a) and screwed to the screw hole (1a), the waterproof structure preventing water from penetrating into a gap between the first member and the second member, the waterproof structure comprising:

the screw being a conical screw (4) whose head has a conical shape, a spacer (3) having an insertion hole where a recessed circular conical surface (3a) is formed to be in surface contact with a circular conical surface of the head of the conical screw (4), wherein the spacer is fitted in the screw insertion hole (2a) and an annular groove (3b) is formed in the outer surface of the spacer (3a); and an O-ring (5) installed in the annular groove (3b), wherein the conical screw (4) is tightened with the spacer (3) placed between the first member (1) and the second member (2), causing the O-ring (5) to be pressed between an inner surface of the annular groove (3b) and a surface of the screw insertion hole of the second member.

2. The waterproof structure according to claim 1, wherein the surface of the second member against which the O-ring is pressed is a circular conical surface coaxial with the conical head screw.

* * * * *